Nov. 3, 1959    O. A. TYSON    2,911,585
LOW INERTIA RATE TACHOMETER
Filed Dec. 30, 1954
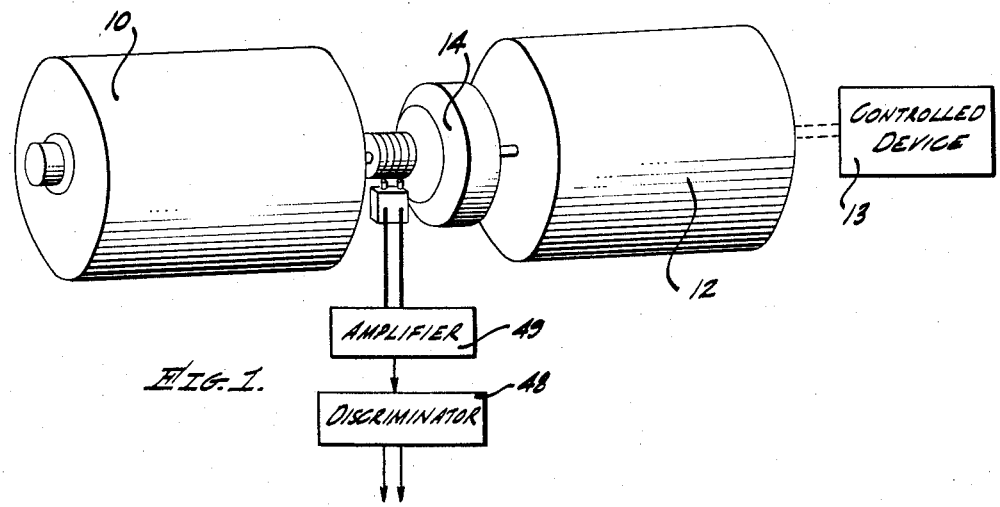
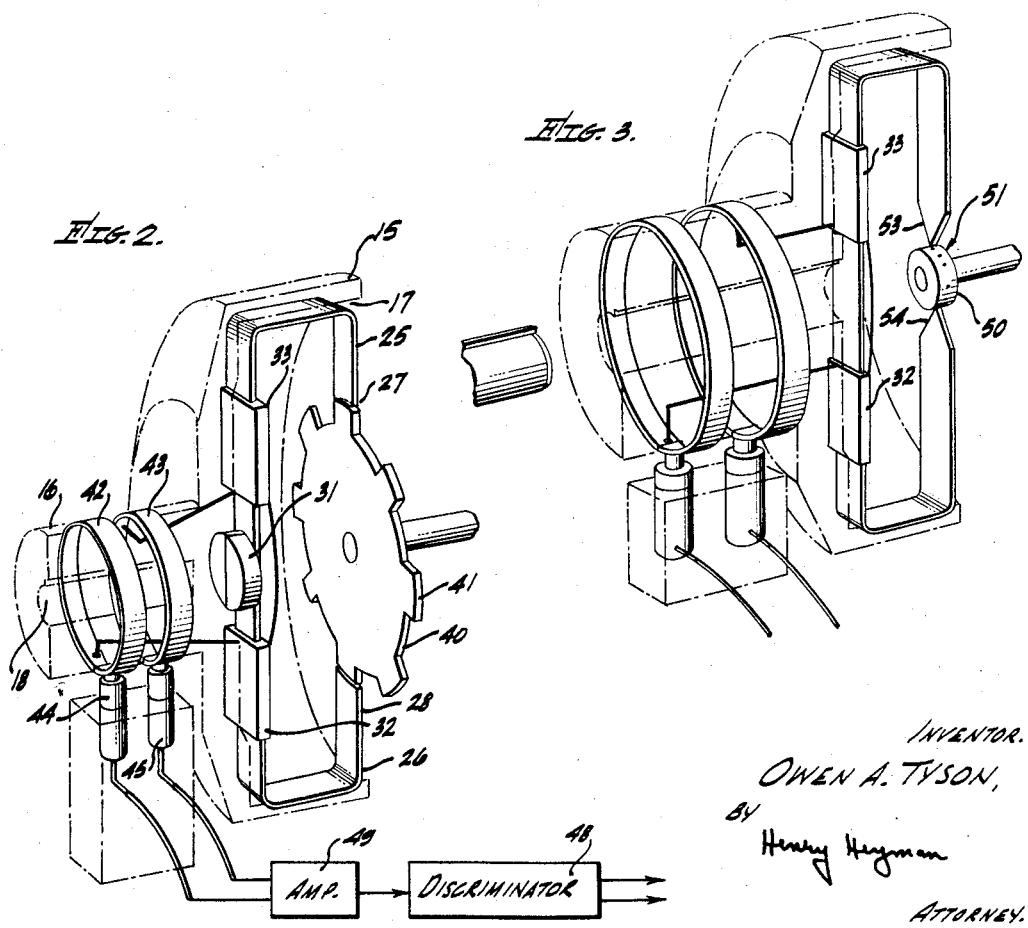
INVENTOR.
OWEN A. TYSON,
BY
Henry Heyman
ATTORNEY.

United States Patent Office
2,911,585
Patented Nov. 3, 1959

2,911,585

LOW INERTIA RATE TACHOMETER

Owen A. Tyson, Pacific Palisades, Calif., assignor to Hughes Aircraft Company, Culver City, Calif., a corporation of Delaware Application December 30, 1954, Serial No. 478,583

5 Claims. (Cl. 322—31)

This invention relates to rate tachometers for servo systems, and more particularly to an improved D.-C. rate tachometer for a low interia servo system, which introduces very little inertia into the servo system.

One of the methods of maintaining an over-all high loop gain in a servo system for actuating a controlled device without encouraging oscillations is by means of a D.-C. rate tachometer. The tachometer is fixed to the shaft of the servo motor within the system to develop a degenerating D.-C. voltage directly proportional to velocity of, and of a sign dependent upon the direction of, rotation of the shaft of the servo motor. This voltage is impressed upon a balanced modulator which controls the operation of the servo motor so as to reduce the over-all loop gain as a function of velocity. A serious disadvantage of prior art tachometer control arrangements is that they introduce into low inertia servo systems an inertia that is large in comparison with the inertia of the servo motor and its associated mechanical circuits. This causes a reduction in the rate of response of the system at critical damping.

It is therefore the primary object of this invention to provide a D.-C. rate tachometer for a servo system that introduces very little inertia into the system in comparison with the total inertia of the system.

It is another object of this invention to provide an improved D.-C. rate tachometer control arrangement for a low inertia servo system in which the total inertia of the servo system is substantially unaffected by the tachometer.

It is a further object of this invention to provide an improved D.-C. rate tachometer control arrangement for a servo system, which utilizes component parts of simple design and rugged construction, capable of dependable operation over a long operating life.

In accordance with the present invention, the foregoing objects are achieved by a tachometer structure in which the shaft of a servo motor is magnetically coupled to the shaft of a constant speed motor, and in which an A.-C. signal is developed which has a frequency dependent upon the relative angular velocity between the servo motor and the constant speed motor. The output voltage from the A.-C. generating circuit is applied to a frequency discriminator to develop a D.-C. signal having a magnitude proportional to the servo motor velocity and a polarity dependent upon the direction of rotation of the servo motor. The D.-C. signal may be utilized in the conventional manner to control the operation of the servo system.

The novel features which are believed to be characteristic of the invention, both as to its organization and method of operation, together with further objects and advantages thereof, will be better understood from the following description considered in connection with the accompanying drawing, made a part of this specification, in which different embodiments of the invention are illustrated by way of example. It is to be expressly understood, however, that the drawing is for the purpose of illustration and description only. The scope of the invention is pointed out in the appended claims. In the drawing:

Fig. 1 shows a perspective view of a servo motor employing an improved D.-C. rate tachometer control arrangement, in accordance with this invention; and Figs. 2 and 3 show perspective views of different embodiments of the structure of the D.-C. rate tachometer for use in the control arrangement of Fig. 1, further in accordance with this invention.

Referring to Figs. 1 and 2, a constant speed motor 10 rotates a magnetically polarized bi-polar generator field affixed within a housing 14. A light weight low inertia reluctance modulator, in the form of a circular disk having a plurality of rectangular spokes of equal dimensions on its periphery, secured to the shaft of a servo motor 12 is utilized to produce an A.C. output voltage of varying frequency from the generator field. The shaft of servo motor 12 is further coupled to a controlled device 13. Housing 14 comprises cylindrical and hub sections 15 and 16 symmetrically located about a common axis. Cylindrical section 15 and hub section 16 have bores 17 and 18, each bore also being symmetrical about the common axis, bore 17 having a diameter substantially greater than bore 18. Housing 14 is affixed to the shaft of constant speed motor 10 in any conventional means, such as, by the well known slot and key interlock.

The generator field includes a magnetic permeable circuit such as, for example, in the form of two U-shaped iron bars 25 and 26 of suitable magnetic material, having poles 27 and 28. Bars 25 and 26 are supported in opposed relation, on the inner surface of cylindrical section 15, such as, for example, as shown by being fitted snugly within the bore 17. Affixed between bars 25 and 26 is a polarized permanent magnet 31. A pair of serially connected induction coils 32 and 33 are inductively coupled to the magnetic circuit provided by bars 25 and 26.

Affixed to the shaft of the servo motor is a circular disk 40 having a plurality of spokes 41 of substantially equal dimensions on its periphery. Circular disk 40 is interposed between poles 27 and 28 in a manner so that the reluctance of the magnetic circuit is uniformly varied when the circular disk is rotated. The output voltage from the generator field is taken off by a pair of slip rings 42 and 43 insulatingly supported on hub section 16. Slip rings 42 and 43 are each electrically connected to each free end of serially connected induction coils 32 and 33. The output voltage is transferred by means of brushes 44 and 45, to a carrier suppressing frequency discriminator 48 after having been first amplified by amplifier 49. The D.C. output voltage from frequency discriminator 48 may then be utilized, in the same manner as the output of the prior art rate tachometer, to control the servo system.

Assuming the reluctance modulator to have 10 modulating elements and the constant speed motor to be operating at 3600 revolutions per minute, a 600 cycle per second alternating current will be induced in the rotating field when the servo motor is stationary. However, if the servo motor were to rotate, for example, at 600 revolutions per minute, in the same direction as the rotating field, the frequency of the alternating current will change to 500 cycles per second. Alternatively, if the servo motor rotates at 600 revolutions per minute in the opposite direction of the rotating field, a 700 cycle per second alternating current will be induced in the rotating field. The resultant field voltage is then operated upon by carrier suppressing frequency discriminator 48 designed to have zero direct current output when the servo motor has a velocity of zero, and a finite and equal voltage for a predetermined number of revolutions per minute in either direction. The sign of the output voltage is dependent upon the direction of rotation of the servo motor, hence, with linear discriminator operation a linear change in voltage through zero results from a change in the servo motor's speed from a predetermined number of revolutions per second in one direction to the same predetermined number of revolutions per second in the opposite direction. In this manner, all conditions for a useful servo rate tachometer are met but with an appreciably reduced inertia loading to the servo in contrast with present means. Since the output of the frequency discriminator is dependent upon the frequency of the output voltage of the magnetic generating circuit which, in turn, is dependent upon the relative angular velocity between the servo motor and the constant speed motor, the direct current output will have a magnitude proportional to the servo velocity and a sign dependent upon the direction of rotation of the servo motor.

Fig. 3 shows another embodiment of the invention in which the permanent magnet and the circular disk are replaced with a small cylindrical disk 50, which has affixed to its periphery a piece of recording tape 51 magnetized by any conventional means so as to have a plurality of equidistant magnetic poles. Poles 53 and 54 of the low reluctance magnetic circuit are pointed to accommodate the small distance between the magnetic poles on tape 51. Rotation of the housing again will cause a voltage to be induced into induction coils 32 and 33 resulting in an alternating current being derived from the rotating field whose frequency is dependent upon the relative angular velocity between the servo motor and the constant speed motor. The number of magnetic poles on the magnetic tape and the speed of the constant speed motor determines the frequency of the generated voltage when the servo motor is at rest. The choice of these two variables is dependent upon the discriminator available or desired. The output of the frequency discriminator will again be a direct current whose magnitude is proportional to the servo motor velocity and whose sign is dependent upon the direction of rotation of the servo motor.

What is claimed is:

1. In a servo system for actuating a controlled device by a servo motor having an output shaft, a rate tachometer comprising: a constant speed motor having an output shaft; a magnetic circuit, said magnetic circuit comprising a magnetizable member arranged to form a closed magnetic path having an air gap, said member being coupled to the output shaft of said constant speed motor, and means for establishing a magnetic field through said member; disk member means comprising a lightweight low inertia reluctance modulator interposed in said air gap for varying the number of lines of flux passing through said magnetizable member, said disk member means being coupled to the output shaft of the servo motor; and at least one induction coil juxtaposed to said magnetizable member so as to be inductively responsive to variations of lines of flux within said magnetizable member, whereby an A.-C. voltage is developed in said induction coil whose frequency is dependent upon the relative angular velocity between the output shafts of the servo motor and said constant speed motor.

2. A rate tachometer as defined in claim 1 wherein said magnetizable member consists of two U-shaped bars constructed and arranged to form a magnetic circuit having at least one air gap.

3. A rate tachometer as defined in claim 1 wherein said means for establishing a magnetic field is a magnet juxtaposed with said magnetizable member.

4. A rate tachometer as defined in claim 1 wherein said means for varying the number of lines of flux is a cylindrical disk with a plurality of spokes, said disk being interposed in the air gap portion of said magnetic path.

5. A rate tachometer as defined in claim 1 wherein said means for establishing a magnetic field and said means for varying the flux consists of a cylindrical disk having a plurality of equidistant magnetic poles on its peripheral surface.

References Cited in the file of this patent

UNITED STATES PATENTS

| | | |
|---|---|---|
| 1,345,539 | Fynn | July 6, 1920 |
| 2,125,474 | Wachs | Aug. 2, 1938 |
| 2,553,629 | Behr | May 22, 1951 |
| 2,590,120 | Pesterini | Mar. 25, 1952 |